INVENTOR.
MARION M. FULK
BY JOHN E. SCHRODT

Campbell, Harris and O'Rourke

United States Patent Office 3,574,658
Patented Apr. 13, 1971

3,574,658
DRY-LUBRICATED SURFACE AND METHOD OF PRODUCING SUCH SURFACES
Marion M. Fulk, Livermore, Calif., and John E. Schrodt, Boulder, Colo., assignors to Ball Brothers Research Corporation, Boulder, Colo.
Filed Dec. 22, 1967, Ser. No. 694,028
Int. Cl. B05b 17/00; B24c 1/10
U.S. Cl. 117—8     16 Claims

ABSTRACT OF THE DISCLOSURE

Dry lubricant such as molybdenum disulfide is applied to a solid surface by interposing the lubricant between the surface and a force generating means such as a peening particle, preferably by applying the lubricant initially to the particle, and then fusing the lubricant to the surface by bringing the force to bear upon the surface, and peened surfaces having dry lubricant impacted or fused thereon.

---

The instant invention relates to a method of applying dry lubricants to surfaces and to surfaces so treated. More specifically, this invention relates to a method of applying a dry lubricant by interposing the lubricant between the surface and a peening particle and to surfaces having a dry lubricant impacted or fused thereon by a peening process.

Dry lubricants have been known for some time. However, until recently, such lubricants were of the type represented by graphite and useful only in applications in which low lubricating quality and tenacity were required. With the relatively recent recognition of the outstanding lubrication qualities of molybdenum disulfide type lubricants, the possibility of treating surfaces with a dry lubricant to obviate the need for running in a liquid lubricant has been recognized. Unfortunately, this possibility has not yet been achieved although dry lubrication has been achieved to a limited extent.

One of the first applications of molybdenum disulfide type dry lubricants was as a dispersion in ordinary oil baths, such as an automobile crank case or transmission. While such machinery has proven to be more resistant to wear when the oil was drained for dry-bearing testing purposes relative to a similar test with machinery lubricated only by the oil per se, there has been substantial evidence that the free dispersion of dry lubricant also tends to act as an abrasive. This is probably due to the fact that the particles do not all become "plated" or applied in a lubricating manner but act as discreet, nonlubricating, i.e., abrasive, particles when in a dispersion. Even the dry lubrication obtained permitted operation only for a somewhat longer time before seizure.

Another more complicated and somewhat successful process involving dry lubrication is that in which the dry lubricant is admixed with a resin binder and applied to surfaces to be lubricated. This process requires undersized parts since the binder and lubricant add a noticeable increase in dimensions to the part. Also, the binders usually used must be baked at relatively high temperatures to cure the binder and gain the required strength therefrom. However, since the binder is normally organic in nature, operating temperatures of the thus lubricated surface are limited by the decomposition temperature of the binder, which is usually substantially lower than that at which the lubricant or surface will fail. Since the binder and lubricant produce a definite, finite coating, it is not unusual for film particles to loosen during operation. These particles are of rather substantial size and can cause jamming and extreme wear in bearings, cams, and other close tolerance-bearing surfaces.

In general, the binder-secured dry lubricant is a step in the right direction, but is a complicated treatment with many shortcomings.

It is an object of the instant invention to provide dry-lubricated bearing surfaces which are operable over very broad temperature ranges.

Another object of the instant invention is to provide a process by which dry lubricants may be applied in a superior manner to standard size, off-the-shelf parts.

Still another object of the instant invention is to provide a process for applying dry lubricants to surfaces of virtually all configurations or geometry.

Yet still another object of the instant invention is to provide a dry-lubricated surface having a low coefficient of friction and rate of wear which is not subject to particle flaking.

Still yet another object of the instant invention is to provide a dry-lubricated surface having an extremely low vapor pressure in order that the lubricating qualities may be maintained in a vacuum.

Yet another object of the instant invention is to provide a method by which dry lubricants may be easily and readily applied with consistent superior results.

A further object of the instant invention is to provide a means of preventing direct metal-to-metal contact between moving parts.

Another object of the instant invention is to provide a method by which dry lubricants may be applied to polymers and soft metals which degrade at relatively low temperatures.

Other objects and advantages of the instant invention will be apparent from the following discussion and drawings.

According to the instant invention, dry lubricants are applied to surfaces by impacting them thereon to cause the lubricant to fuse to the surface. A rather troublesome and less desirable method of accomplishing this is by burnishing or rubbing a dry lubricant into the surface. However, this is clearly a time-consuming and cumbersome process. Though worthwhile results have been accomplished with the burnishing approach, the results are markedly inferior to those accomplished by the preferred embodiment of the instant invention.

Preferably, the dry lubricant is impacted upon the surface by interposing it between the surface and a peening particle. A peening particle, of course, travels at high speeds and impacts with very high localized pressures upon the surface. This has been found to securely adhere and fuse the dry lubricant to the surface and produce a most superior dry-lubricated surface. Peening in itself is a desirable and worthwhile process which induces surface compression and hardening thereby minimizing the possibility of surface cracking. Thus, the peening application of a dry lubricant not only adheres the lubricant to the surface in a superior manner, but also improves the basic quality of the surface as a bearing surface.

Burnishing and peening are illustrative of the force generating means which may be used to impact the dry lubricant upon the surface.

It has been found most advantageous and economical to initially adhere a dry lubricant to a peening particle. This is done by merely admixing the peening particles, which are often quite small in size, with the dry lubricant. The coated peening particles are then propelled at the surface at a very high velocity. Upon impacting with the surface, the dry lubricant is forced onto the surface and fused thereto.

Dry lubricants are, as is well known in the art, solid materials which facilitate movement between contacting surfaces by providing lubrication.

Typical of the dry lubricants useful in the instant invention, are molybdenum disulfide, tungsten disulfide, titanium disulfide, molybdenum diselenide, tungsten diselenide, niobium diselenide, and molybdenum ditelluride. As will be recognized by those skilled in the art, the method of the instant invention is applicable to a number of dry lubricants. The results obtainable with the preferred embodiments of molybdenum disulfide and tungsten disulfide, have been superior.

The operating conditions of the instant invention are not critical and, other than the step of interposing the dry lubricant between the peening particle and the surface, are essentially the same as the well known and conventional requirements for ordinary peening of a surface. That is, temperature is not a critical factor and the operation is merely continued until the entire surface has been thoroughly peened. Peening apparatus utilizing microspheres is preferred in order that the surface roughness of the bearing surface is not objectionable. The microspheres, or balls, make only a very small impression upon the surface and do not materially roughen it. Apparatus which propels the balls with air has been found useful. Cutting apparatus using this propulsion mechanism is operable with microspheres substituted for the conventional abrasive. The minor depressions which do result are often advantageous in that they serve as reservoirs for lubricant. Lubricant is believed to be available for the "contact" portion of the bearing as it is "run in."

Numerous surfaces may be treated according to the instant invention. Typical of those which have been successfully treated are types 304, 416, 421, 440C, and A286 steel compositions. Also, coin silver, brasses, beryllium-copper alloys, titanium, aluminums, magnesium, and other metals have been successfully dry-lubricated. Ceramics have also been successfully dry-lubricated. A particularly unique aspect of the invention is the ability to dry-lubricate plastics. Since the peening can be accomplished at room temperature, plastics commonly used as gears or cams, such as nylon, have been successfully treated. the wear qualities of the plastic are improved severalfold by the dry lubrication.

The invention will be more readily understood with reference to the drawings in which.

Figure 1:
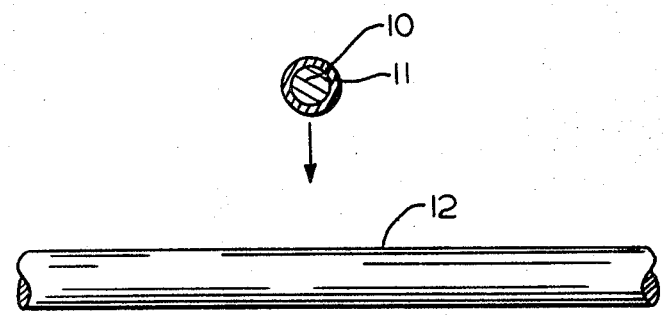
FIG. 1 is a simplified representation of the initial portion of the process of the instant invention.
Figure 2:
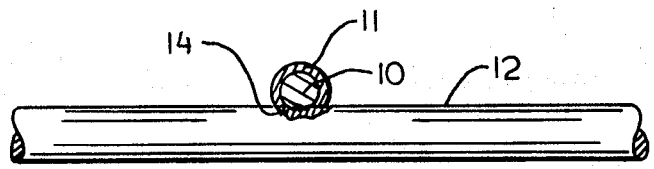
FIG. 2 is a simplified illustration of the peening portion of the process of the instant invention; and, FIG. 3 is a simplified illustration of a surface lubricated in part according to the instant invention.
Figure 3:
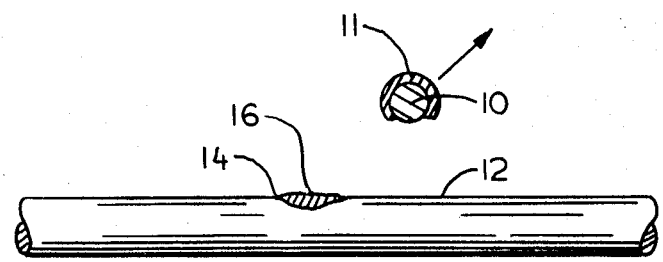

With reference to FIG. 1, a peening ball 10 is coated with a layer of dry lubricant 11. The ball 10 with its coating of lubricant 11 is propelled at a substantial velocity towards surface 12. When, as shown in FIG. 2, ball 10 with lubricant coating 11 impacts upon surface 12, an indentation 14 is produced. For purposes of illustration, indentation 14 is greatly exaggerated in the drawing. Ball 10 then rebounds from surface 12 as shown in FIG. 3. However, a portion 16 of the dry lubricant is transferred from ball 10 to surface 12 and fused within impact depression 14.

Of course the drawing is greatly exaggerated and oversimplified in that, for instance, the entire surface 12 would be covered with fused dry lubricant 16. However, the additional surface coating is repetitive and the drawing thus illustrates the principle of the invention.

An even more complete understanding of the invention and the advantages accruing therefrom will be gained from consideration of the following examples.

EXAMPLE I

Two 440C steel surfaces, surface A and surface B, were treated with molybdenum disulfide. Surface A was treated by sprinkling molybdenum disulfide onto the surface and then rubbing it into the surface using a high speed burnishing wheel. Surface B was treated by sprinkling molybdenum disulfide onto the surface and then peening the surface using microspheres propelled by a high velocity air blast. The two treated surfaces were formed into discs and tested in a vacuum by rotating the discs with pins of equal area and loading bearing thereupon. It was found that surface B, treated by the peening process, displayed a resistance to wear six times that displayed by surface A which was treated by the burnishing process.

EXAMPLE II

Two 303 stainless steel surfaces were treated in manners identical to that of Example I. It was found that the peened surface displayed wear properties superior to the burnished surface by a factor of 60 when tested in a vacuum.

Further, it was noted in both of the examples that the wear properties of the peened surfaces improved during testing while the burnished surfaces degraded. This is attributed to the galling of the burnished surfaces because of insufficient lubrication while the peened surfaces merely polished because of proper lubrication.

EXAMPLE III

Spur gears of 303 stainless steel having 1/8 inch face were dry-lubricated by coating molybdenum disulfide onto glass microspheres of between 50 and 100 microns diameter and impacting the spheres onto the spur gears to transfer the dry lubricant thereto. These gears have been operated in a vacuum at speeds varying from 30 to 3,000 r.p.m. and have accumulated over 400,000,000 revolutions with no apparent wear or increase in torque required to turn the gears.

EXAMPLE IV

Gears were run using steel bearings of 52100 steel. These bearings were supplied with lubricant by the manufacturer, but seized after 1,800 hours. After seizure, similar bearings were dry-lubricated in the manner set forth in Example III. Bearings lubricated according to the instant invention continue to run after 4,000 hours with no sign of failure.

While glass microspheres have been used, other sphere materials are useful. Glass spheres are discarded after use to provide high quality. However, metal spheres, particularly stainless steel, can be recycled and reused, thereby salvaging the lubricant remaining on the spheres. This can be very important in production situations.

From the above discussion and examples, it is apparent that the instant invention provides superior dry lubrication. While the advantages of dry lubrication for conventional purposes is readily apparent, it must also be recognized that such lubrication is of particular importance for space use. Under high vacuum conditions, metals commonly weld to one another upon contact. Conventional liquid lubricants are not satisfactory for high vacuum use because of vaporization of the lubricant. With regard to space use, vaporization results not only in failure of lubrication, but also contaminates equipment surrounding the lubricant. Thus it will be recognized that the above examples utilizing high vacuum conditions represent a use much more demanding than normally encountered because of the cold welding propensity, and one in which conventional oil bath lubricants would be entirely ineffective if not detrimental.

It will be apparent from the above description and drawings that various modifications of the method and surface may be made within the scope of the invention. Therefore, the invention is not intended to be limited to the particular examples or illustrations employed except as may be required by the following claims.

What is claimed is:

1. A method of dry lubricating a surface comprising, adhering a dry lubricant to a nonabrasive peening particle, and peening the surface to fuse the dry lubricant thereon by impacting the particle upon the surface at a velocity sufficient to permanently depress and locally compress said surface at the point of impact.

2. A method of dry lubricating a surface comprising, coating a dry lubricant onto a nonabrasive peening particle, propelling the peening particle at the surface to be lubricated, impacting the particle with the surface and fusing a portion of the dry lubricant on the particle to the surface by means of the impact energy and producing a local depression and surface compression at the point of impact.

3. A method as set forth in claim 2, in which the dry lubricant is selected from the group consisting of, molybdenum disulfide, tungsten disulfide, titanium disulfide, molybdenum diselenide, tungsten diselenide, niobium diselenide, and molybdenum ditelluride.

4. A method as set forth in claim 2 in which the surface to be lubricated is a metal.

5. A method as set forth in claim 2 in which the surface to be lubricated is a polymer.

6. A method as set forth in claim 2 in which the dry lubricant is molybdenum disulfide.

7. A method as set forth in claim 2 in which the dry lubricant is tungsten disulfide.

8. A method for dry lubricating a metal surface comprising, adhering a coating of molybdenum disulfide to a nonabrasive peening ball, and impacting the peening ball on a metal surface to transfer and fuse a portion of the molybdenum disulfide to the surface while producing a depression and local surface compression in the surface at the point of impact, whereby a tenacious, lubricating layer of molybdenum disulfide is provided on the nonabraded surface.

9. A dry-lubricated article comprising, a surface covered with depressions, local surface compression at the depressions, and a layer of dry lubricant fused to said surface in the area of said depressions.

10. An article as set forth in claim 9 in which the dry lubricant is selected from the group consisting of, molybdenum disulfide, tungsten disulfide, titanium disulfide, molybdenum diselenide, tungsten diselenide, niobium diselenide, and molybdenum ditelluride.

11. An article as set forth in claim 9 in which the dry lubricant is molybdenum disulfide.

12. An article as set forth in claim 9 in which the surface is a metal.

13. An article as set forth in claim 9 in which the surface is a polymer.

14. A dry-lubricated metal article comprising a metal surface having depressions therein, said depressions being defined by a portion of the metal surface under compression, and a dry lubricant fused to said metal at the portion thereof defining said depressions.

15. An article as set forth in claim 14 in which said dry lubricant is molybdenum disulfide.

16. An article as set forth in claim 14 in which said dry lubricant is tungsten disulfide.

References Cited

UNITED STATES PATENTS

| | | | |
|---|---|---|---|
| 2,387,872 | 10/1945 | Bell | 117—Antifriction |
| 3,259,519 | 7/1966 | Physioc | 117—109X |
| 3,387,985 | 6/1968 | Huber | 117—109X |

FOREIGN PATENTS

| | | | |
|---|---|---|---|
| 530,868 | 9/1956 | Canada | 117—109 |
| 667,640 | 7/1963 | Canada | 117—109 |

OTHER REFERENCES

Kee: "Plating Parts By Peening Them," Product Engineering, Mar. 14, 1960, vol. 31, No. 11, pp. 70–72.

ALFRED L. LEAVITT, Primary Examiner

J. H. NEWSOME, Assistant Examiner

U.S. Cl. X.R.

72—43, 53; 117—104, 109, 120, 127; 252—12, 31